United States Patent
Cartier Millon et al.

(10) Patent No.: US 8,624,447 B2
(45) Date of Patent: Jan. 7, 2014

(54) ELECTRICAL ENERGY-GENERATING DEVICE AND REMOTE CONTROL EQUIPPED WITH SUCH A DEVICE

(75) Inventors: Christophe Cartier Millon, Bresson (FR); Didier Vigouroux, Brignoud (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 524 days.

(21) Appl. No.: 12/956,318

(22) Filed: Nov. 30, 2010

(65) Prior Publication Data
US 2011/0133975 A1    Jun. 9, 2011

(30) Foreign Application Priority Data

Dec. 4, 2009    (FR) ...................................... 09 05865

(51) Int. Cl.
*H04L 17/02*    (2006.01)

(52) U.S. Cl.
USPC ............................................. 310/15; 290/1 R

(58) Field of Classification Search
USPC ................... 310/15–36; 290/1 R; 341/176
See application file for complete search history.

(56) References Cited

U.S. PATENT DOCUMENTS

| | | | |
|---|---|---|---|
| 3,928,988 A | 12/1975 | Luth | |
| 6,140,730 A | 10/2000 | Tkaczyk et al. | |
| 7,989,971 B2 * | 8/2011 | Lemieux | 290/1 R |
| 8,148,856 B2 * | 4/2012 | Bataille et al. | 310/36 |
| 8,228,151 B2 * | 7/2012 | Schmidt | 335/296 |
| 8,253,283 B2 * | 8/2012 | Bataille et al. | 310/36 |
| 2004/0090210 A1 * | 5/2004 | Becker et al. | 322/1 |
| 2006/0091984 A1 | 5/2006 | Schmidt | |
| 2008/0048506 A1 | 2/2008 | Deak | |

FOREIGN PATENT DOCUMENTS

| | | |
|---|---|---|
| DE | 20 2005 000 784 U1 | 6/2006 |
| DE | 20 2008 016 823 U1 | 4/2009 |
| DE | 10 2008 003 596 A1 | 7/2009 |

OTHER PUBLICATIONS

French Preliminary Search Report issued Jul. 15, 2010, in French 0905865, filed Dec. 4, 2009 (with English Translation of Categories of Cited Documents).

* cited by examiner

*Primary Examiner* — Tran Nguyen
*Assistant Examiner* — Naishadh Desai
(74) *Attorney, Agent, or Firm* — Oblon, Spivak, McClelland, Maier & Neustadt, L.L.P.

(57) ABSTRACT

An electric power-generating device (1) comprising a movable portion forming a magnetic circuit fitted with a core (5) and branches (11, 12, 13, 14) coupled magnetically to the said core, a fixed portion provided with a permanent magnet (31, 32, 33, 34), a mechanism for rotating the movable portion about an axis of rotation (20) supporting the said core, and an electric coil (21) wound around the said core in order to gather the electric power obtained when the said movable portion rotates, the said generating device comprising priming and driving means (51, 52) coupled to control means (71, 72) in order to establish a priming of the said mechanism and interacting with the said movable portion in order to drive it by releasing a priming power at the end of travel of the said control means.

A remote control provided with the generating device.

14 Claims, 7 Drawing Sheets

US 8,624,447 B2

ELECTRICAL ENERGY-GENERATING DEVICE AND REMOTE CONTROL EQUIPPED WITH SUCH A DEVICE

TECHNICAL FIELD OF THE INVENTION

The invention relates to the field of power-generating devices and of remote controls provided with such generating devices in order to electrically power remote control means by the operation of an operating member of the said remote control. The invention is particularly suited to small wall remote controls, for example the remote controls that replace conventional wall switches in order to control the opening and closure of switching means which have been slaved to the said remote control.

The invention relates in particular to an electric power-generating device comprising:
- a first main portion made of a ferromagnetic material forming at least one magnetic circuit comprising a core and at least one pair of branches magnetically coupled to the said core supporting closure ends of the said at least one magnetic circuit,
- a second main portion comprising at least one permanent magnet placed to close the said magnetic circuit by relative movement of the said first main portion relative to the said second main portion, the said at least one permanent magnet being polarized in order to have a magnetic flux flow in the said magnetic circuit when the said magnetic circuit is closed,
- a mechanism for movement by rotation of a movable portion consisting essentially of one or other of the said main portions about an axis of rotation supporting the said core in order to close the said at least one magnetic circuit, and
- an electric coil wound around the said core in order to gather the electric power obtained while the said movable portion rotates.

The invention also relates to a remote control for remotely controlling slaved means, the said remote control comprising an operating member and an electric power-generating device in order to supply the said remote control.

PRIOR ART

U.S. Pat. No. 6,140,730 describes a generator comprising two plates made of a ferromagnetic material provided with a plurality of arms, the said plates being mounted on a shaft around which an electric coil is wound, the said generator also comprising a movable portion that can be rotated about the said shaft and provided with a permanent magnet comprising several poles. In this generator, the magnet of the movable portion is placed relative to the arms of the said plates in order to establish a magnetic field through the coil and of which the intensity can be varied as a function of the rotation of the said movable portion. The variation of this magnetic field therefore makes it possible to generate at the terminals of the coil an electric power dependent on the speed of variation of the said magnetic field.

A drawback of this generator is that it is not suitable for being activated by means of an operating member of a remote control, in particular an operating member that can occupy two positions for, for example, controlling the opening or the closure of a switch.

DESCRIPTION OF THE INVENTION

The object of the invention is to remedy the drawbacks of the electricity generating devices of the prior art by proposing an electric power-generating device comprising:
- a first main portion made of a ferromagnetic material forming at least one magnetic circuit comprising a core and at least one pair of branches magnetically coupled to the said core supporting closure ends of the said at least one magnetic circuit,
- a second main portion comprising at least one permanent magnet placed to close the said magnetic circuit by relative movement of the said first main portion relative to the said second main portion, the said at least one permanent magnet being polarized in order to have a magnetic flux flow in the said magnetic circuit when the said magnetic circuit is closed,
- a mechanism for movement by rotation of a movable portion consisting essentially of one or other of the said main portions about an axis of rotation supporting the said core in order to close the said at least one magnetic circuit, and
- an electric coil wound around the said core in order to gather the electric power obtained while the said movable portion rotates, the said device being characterized in that the said movement mechanism comprises control means and priming and driving means coupled to the said control means in order to establish a priming of the said mechanism by accumulating a priming power generated by at least one portion of the travel of the said control means, the said priming and driving means interacting with the said movable portion in order to drive it between two stable positions while releasing the said priming power at the end of travel of the said control means.

Preferably, the first main portion comprises a first pair of branches and a second pair of branches forming respectively a first magnetic circuit and a second magnetic circuit, and the second main portion comprises a first group of at least two permanent magnets placed in order to respectively close the said first and the said second magnetic circuit in a first stable position of the movable portion, the said permanent magnets of the said first group being polarized in order to increase the magnetic flux in the core in the said first stable position of the movable portion. Advantageously, the branches of the first pair of branches and the branches of the second pair of branches are mounted fixedly on the core and extend radially in directions substantially opposite to the axis of rotation. Advantageously, the second main portion comprises a second group of at least two permanent magnets placed in order to close respectively the said first and the said second magnetic circuit in a second stable position of the movable portion, the said permanent magnets of the said second group being polarized in order to increase and reverse the magnetic flux in the core in the said second stable position of the movable portion.

According to another embodiment, the movable portion consists essentially of the first main portion. Preferably, the priming and driving means comprise a first flange and a second flange mounted so as to rotate about the axis of rotation, the said first flange interacting with at least one driving branch of the first pair of branches of the said movable portion in order to rotate the said movable portion in a first direction, the said second flange interacting with at least one driving branch of the second pair of branches of the said movable portion in order to rotate the said movable portion in a second direction opposite to the said first direction. Advantageously, the first flange and the second flange comprise a shoulder provided with a bearing face interacting with an edge of the driving branch of respectively the first pair of branches and the second pair of branches.

Preferably, the control means comprise a priming arm mounted securely on each flange and extending radially relative to the axis of rotation. Advantageously, the priming arm of the first flange and the priming arm of the second flange are designed in order to rotate respectively the first flange in the second direction and the second flange in the first direction.

According to a second embodiment, the device also comprises:
- power-accumulation means interacting with the said priming and driving means in order to store the priming power while the movement mechanism is primed, and
- a lock interacting with the said priming and driving means in order to lock the movable portion while the movement mechanism is primed and in order to unlock the said movable portion at the end of travel of the control means.

Preferably, the power-accumulation means comprise a spring mounted between the priming arm of the first and of the second flange.

Preferably, the lock comprises a lever mounted so as to pivot about a lock spindle the said lever comprising a first and a second lock arm interacting with an anchoring arm respectively of the first and of the second flange in order to immobilize respectively the first flange or the second flange during the travel of the priming arm respectively of the second flange or of the first flange, and in order to release respectively the first flange or the second flange at the end of travel of the said priming arm respectively of the second flange or of the first flange. Advantageously, the first and the second lock arms each comprise:
- a sliding face extending from a free end of the said lock arm to the lock spindle, the said sliding face interacting with the end of the anchoring arm respectively of the first or of the second flange in order to hold the lock in a position allowing the immobilization of the anchoring arm respectively of the second or of the first flange, and
- a notch placed between the said sliding face and the lock spindle, the said notch interacting with the end of the anchoring arm respectively of the first or of the second flange in order to immobilize the said anchoring arm and in order to switch the said lock into a position allowing the release of the anchoring arm respectively of the second or of the first flange.

The invention also relates to a remote control for remotely controlling slaved means, the said remote control comprising an operating member and an electric power-generating device in order to supply the said remote control, characterized in that the generating device is as described above, the said device comprising control means coupled to the said operating member.

BRIEF DESCRIPTION OF THE FIGURES

Other advantages and features will emerge more clearly from the following description of particular embodiments of the invention given as non-limiting examples and shown in the appended figures.

DETAILED DESCRIPTION OF AN EMBODIMENT

Figure 1:
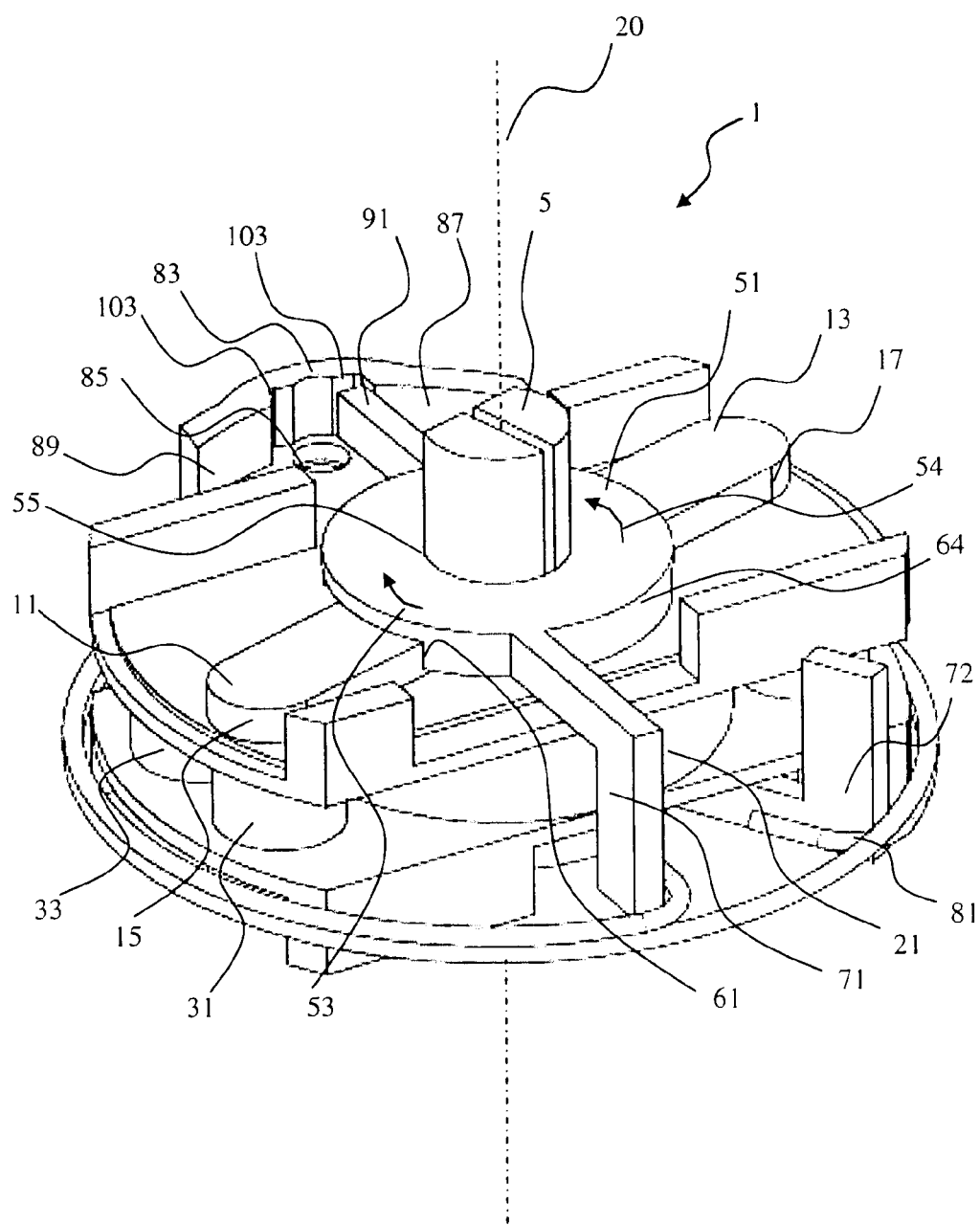
FIG. 1 is a view in perspective of one embodiment of the generating device according to the invention.
Figure 2:
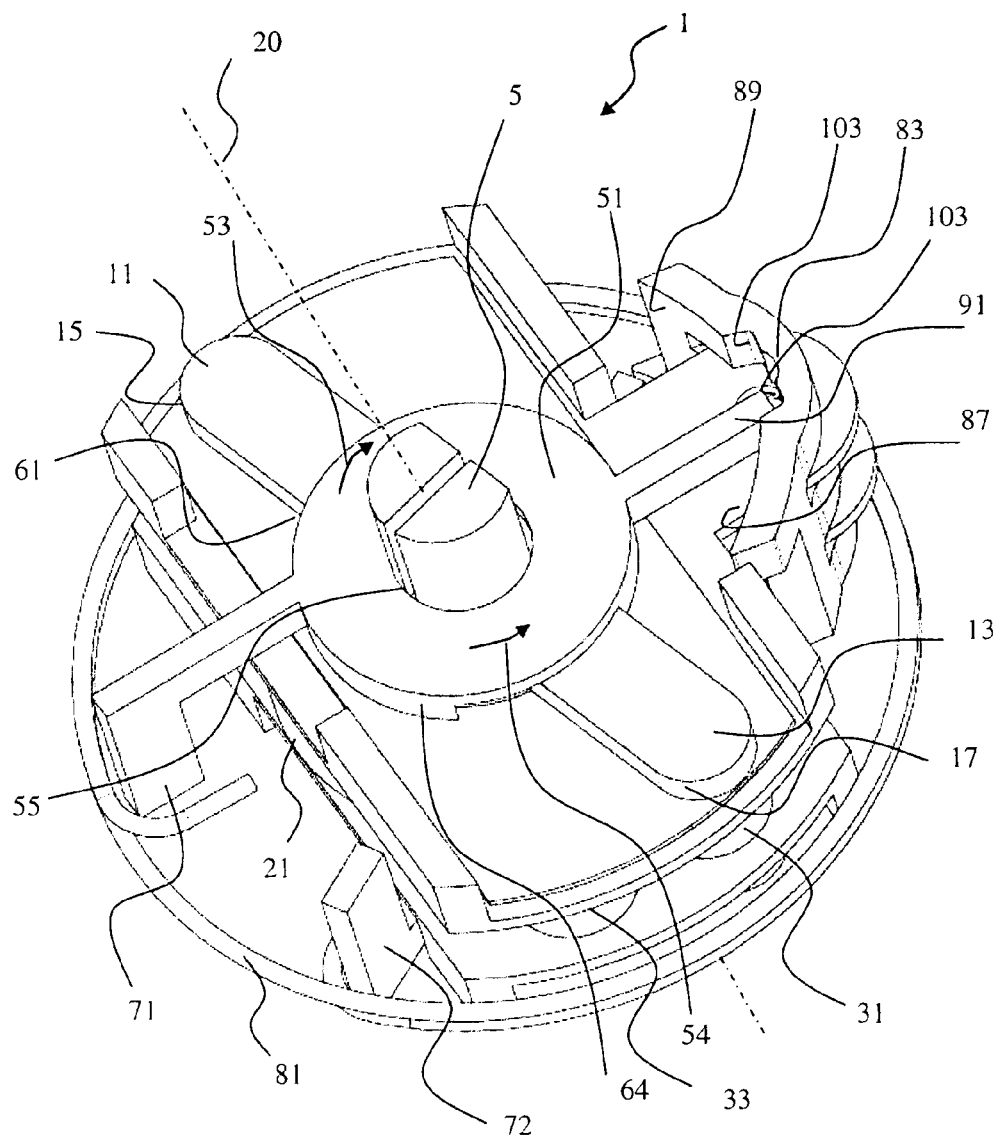
FIG. 2 is a view in perspective at a different angle of the generating device shown in FIG. 1.
Figure 3:
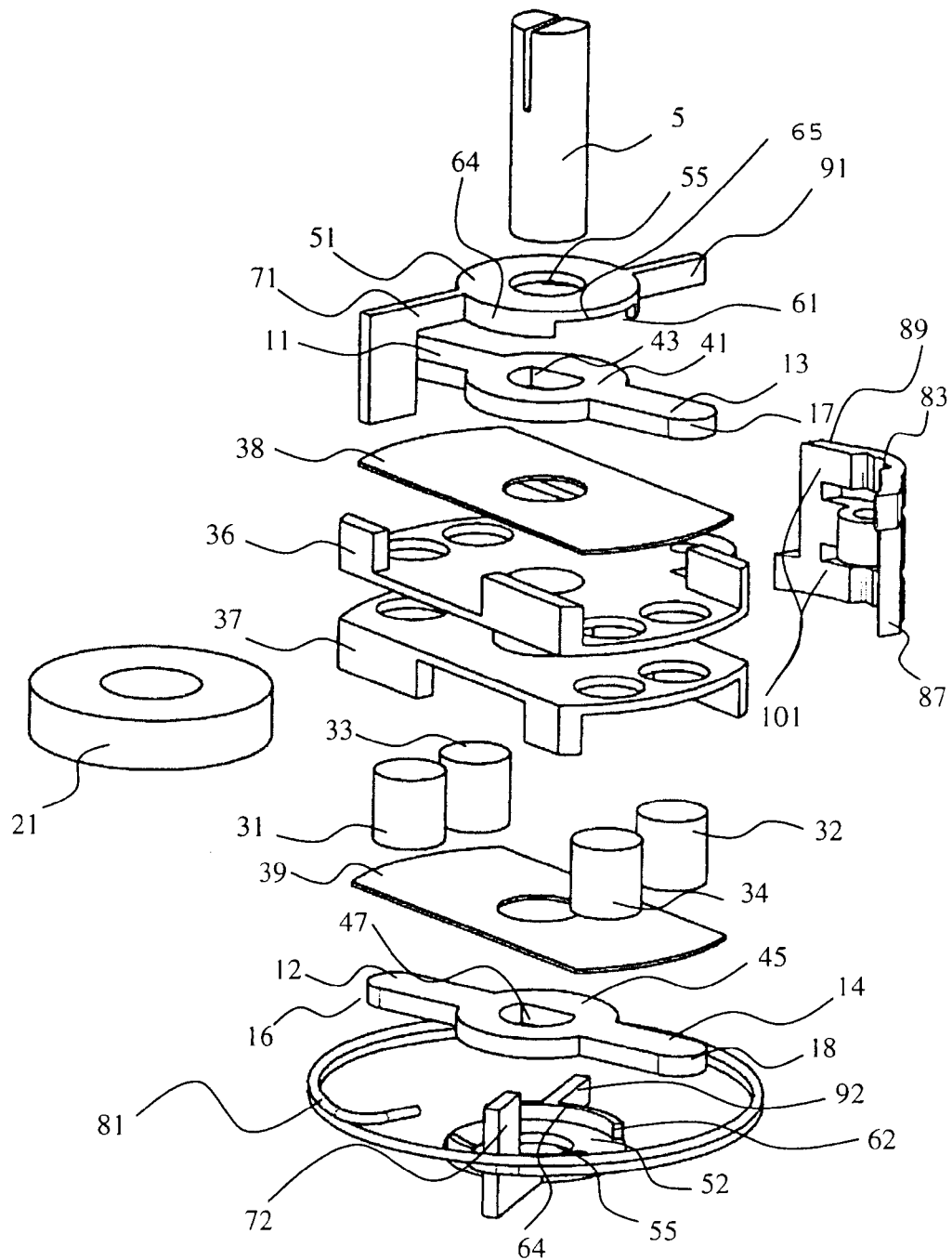
FIG. 3 is an exploded view of the generating device shown in FIG. 1.

With reference to FIGS. 1 to 3, the electric power-generating device 1 comprises a first main portion made of a ferromagnetic material comprising a core 5, a first pair of branches 11, 12 and a second pair of branches 13, 14. One end of the said branches is fixed to the core 5, so as to obtain a magnetic coupling between the said branches and the said core. In FIGS. 1 and 2, only the upper branches 11, 13 of each pair can be seen. The lower branches 12, 14 of each pair can, for their part, be seen in FIG. 3. The branches 11, 12 of the first pair of branches are placed relative to the core 5 in order to form a first magnetic circuit comprising closure ends 15, 16 placed at the free end of the said branches. In the same manner, the branches 13, 14 of the second pair of branches are placed relative to the core 5 in order to form a second magnetic circuit comprising closure ends 17, 18 placed at the free end of the said branches. Therefore, the core 5 is common to the first and to the second magnetic circuit.

The closure of the first and/or of the second magnetic circuit can be achieved with the aid of permanent magnets by placing them between the closure ends 15, 16, 17, 18 of a pair of branches 11, 12, 13, 14. These permanent magnets form a second main portion of the generating device which is described in greater detail below.

When these permanent magnets are polarized in order to create a magnetic field between the closure ends 15, 16, 17, 18 of the first and/or of the second magnetic circuit, a magnetic flux flows in the core 5. The generation of electricity is therefore achieved by a relative movement of the magnetic circuits relative to these permanent magnets in order to close the first and/or the second magnetic circuit. This relative movement makes it possible to vary the magnetic flux flowing in the core 5. A coil 21 made of copper wound around a plastic carcass placed around the core 5 makes it possible to gather the electric power obtained by variation of magnetic flux in the core.

The electricity-generating device 1 therefore comprises a mechanism for movement of a movable portion in order to close the first and/or the second magnetic circuit. In the embodiment shown, this movable portion consists essentially of the first main portion, that is to say the core 5 and the branches 11, 12, 13, 14 coupled magnetically to the said core. This movement of the movable portion is, in this instance, a rotation about an axis of rotation 20 supporting the core 5.

In the embodiment shown in FIGS. 1 to 3, the electric power-generating device 1 comprises the second main portion, mentioned above, the said second main portion comprising a first group of magnets and a second group of magnets in order to close the first and the second magnetic circuit in respectively a first stable position and a second stable position of the movable portion 5, 11, 12, 13, 14. The first group of magnets comprises two permanent magnets 31, 32 which are placed so as to close respectively the first and the second magnetic circuit in a first stable position of the movable portion. The permanent magnets 31, 32 of this first group of magnets are polarized in order to increase the magnetic flux in the core in the first stable position of the movable portion. In this instance, the permanent magnets 31, 32 of the first group of magnets are polarized in the same direction which makes it possible, when the movable portion is in the first stable position, to double the magnetic flux in the core 5. The second group of magnets also comprises two permanent magnets 33, 34 which are placed so as to close respectively the first and the second magnetic circuit in a second stable position of the movable portion. The permanent magnets 33, 34 of the second group of magnets are polarized so as not only to increase, but also to reverse, the magnetic flux in the core in the second stable position of the movable portion. In this instance, the permanent magnets 33, 34 of the second group of magnets are polarized in one and the same direction, this direction being opposite to the direction of polarization of the magnets 31, 32 of the first group of magnets. This configuration makes it possible, when the movable portion is in the second stable position, to double the magnetic flux in the core 5 relative to a magnetic flux generated by a single magnet and to reverse this magnetic flux in the core 5 relative to that obtained in the first stable position of the movable portion. By virtue of this arrangement of the permanent magnets 31, 32, 33, 34 of the second main portion, the transition between the first and the second stable position of the movable portion, in one direction or in the other, is accompanied by a reversal of the magnetic flux resulting from a variation in the said flux that is substantially equal to four times the magnetic flux generated by one of the permanent magnets. The quantity of electric power generated in the electric coil 21 is therefore increased in the same manner.

In the embodiment shown in FIGS. 1 to 3, the permanent magnets 31, 32, 33, 34 are housed in the openings of a plastic carcass formed by two plates 36, 37. The coil 21 and its plastic carcass is inserted between these two plates 36, 37 and placed around the core 5. Two sheets 38, 39 made of plastic or another non-magnetic material make it possible to protect the permanent magnets 31, 32, 33, 34 and form gap surfaces between the said magnets and the closure ends 15, 16, 17, 18 of the branches 11, 12, 13, 14 forming with the core 5 the two magnetic circuits described above.

In the embodiment shown in FIGS. 1 to 3, the branches 11, 12 of the first pair of branches and the branches 13, 14 of the second pair of branches are mounted fixedly on the core 5 and extend radially in directions substantially opposite to the axis of rotation 20. This arrangement of the branches 11, 12, 13, 14 makes it possible to reduce the space requirement of the generating device, notably its dimensions on an axis parallel to the axis of rotation 20.

As can be seen in FIG. 3, the upper branches 11, 13 of each pair of branches are formed in a single piece 41 comprising an opening 43 making it possible to fit the said piece 41 into the core 5. In the same manner, the lower branches 12, 14 of each pair of branches are formed in a single piece 45 comprising an opening 47 making it possible to fit the said piece 45 into the core 5. The pieces 41, 45 can be qualified as paddles. The section of the core 5 coincides with the shape of the openings 43, 47 in order to make it possible to secure the branches 11, 12, 13, 14 to the said core. Advantageously, the sections of the core 5 and of the openings 43, 47 have a break of symmetry of revolution about the axis 20 so as to ensure a simultaneous rotation of all the branches 11, 12, 13, 14. The core 5 and the pieces 41, 45 form the movable portion of the generating device 1. The branches of one and the same pair of branches extend in substantially parallel directions and are substantially of the same length so that the closure ends of the said branches are facing one another. In this manner, the first and the second magnetic circuit formed by the core 5 and respectively the first and the second pair of branches can be closed by inserting a permanent magnet between the closure ends of each pair of branches.

In the embodiment shown, the movable portion consists essentially of the first main portion, that is to say in this instance of the magnetic circuits formed by the branches 11, 12, 13, 14 and the core 5. In other embodiments not shown, the movable portion could essentially consist of the second main portion, that is to say of the permanent magnets designed to close the magnetic circuits of the first main portion.

In order to move the movable portion between the first and the second stable position, the generating device 1 comprises a movement mechanism by rotation of the movable portion 5, 11, 12, 13, 14 about the axis of rotation 20. The movement mechanism comprises control means and priming and driving means coupled to the said control means in order to establish a priming of the said mechanism. The priming and driving means interact with the movable portion in order to drive it between the first stable position and the second stable position in one direction or in the other.

As can be seen in FIGS. 1 to 3, the priming and driving means comprise a first flange 51 and a second flange 52 mounted so as to rotate about the axis of rotation 20. These flanges may also be qualified as coupling flanges. Each flange 51, 52 comprises a circular opening 55 in order to be fitted onto the core 5. The circular shape of the opening 55 of the flanges 51, 52 allows the said flanges to rotate about the core in one direction or in the other. Each flange 51, 52 comprises a ring 64 secured to the said flange and placed coaxially about the core 5. The edges of the ring 64 extend in a direction parallel to the axis of rotation. A notch 65 is arranged on the edges of the ring 64 of the first and of the second flange 51, 52 in order to receive respectively a driving branch 11 of the first pair of branches 11, 12 and a driving branch 14 of the second pair of branches. The first flange 51 interacts with the driving branch 11 of the first pair of branches 11, 12 of the movable portion in order to rotate the said movable portion in a first direction 53. The second flange 52 for its part interacts with the driving branch 14 of the second pair of branches of the movable portion in order to rotate the said movable portion in a second direction 54 opposite to the first direction 53. More precisely, the first flange 51 and the second flange 52 comprise a shoulder 61, 62 formed by one of the edges of the notch 65 arranged in the ring 64 of the said flanges, the said shoulder being provided with a bearing face extending parallel to the axis of rotation 20 and interacting with the edge of the driving branch 11, 14 of respectively the first pair of branches 11, 12 and the second pair of branches 13, 14.

As can be seen in FIGS. 1 to 3, the priming and driving means are coupled to the control means in order to establish a priming of the said mechanism. The control means comprise a priming arm 71, 72 mounted securely to each flange 51, 52 and extending radially relative to the axis of rotation 20. The priming arm 71 of the first flange 51 and the priming arm 72 of the second flange 52 are designed to rotate respectively the first flange 51 in the second direction 54 and the second flange 52 in the first direction 53.

The generating device 1 comprises power-accumulation means interacting with the priming and driving means 51, 52 in order to store the priming power generated by the travel or the movement of the control means 71, 72.

This priming power is generated during at least one portion of the travel or of the movement of the control means 71, 72. In this instance, the power-accumulation means comprise a spring 81 mounted between the priming arms 71, 72 of the first and of the second flange 51, 52.

The generating device 1 comprises a lock 83 interacting with the priming and driving means 51, 52 in order to lock the movable portion 5, 11, 12, 13, 14 during the priming of the movement mechanism and to unlock the said movable portion at the end of travel or of movement of the control means

71, 72. More precisely, the lock 83 comprises a lever mounted so as to pivot about a lock spindle 85 that is parallel and slaved relative to the axis of rotation 20, the said lever comprising a first lock arm 87 and a second lock arm 89 interacting with an anchoring arm 91, 92 respectively of the first and of the second flange 51, 52. During the priming, that is to say during at least one portion of the travel or the movement of the priming arm 72, 71 respectively of the second flange 52 or of the first flange 51, the lock 83 makes it possible to immobilize respectively the first flange 51 or the second flange 52. At the end of travel or of movement of the priming arm 72, 71 respectively of the second flange 52 or of the first flange 51, the lock 83 makes it possible to release respectively the first flange 51 or the second flange 52. The result of this is that the priming power accumulated by the spring 81 during the priming is released and that the released flange can drive, by virtue of this power, the movable portion from one stable position to the other.

More precisely, the first and the second lock arm 87, each comprise a sliding face 101 extending from a free end of the said lock arm to the lock spindle 85, the said sliding face 101 interacting with the end of the anchoring arm 91, 92 respectively of the first and of the second flange 51, 52 in order to hold the lock 83 in a position allowing the anchoring arm 92, 91 respectively of the second or of the first flange 52, 51 to be immobilized. The first and the second lock arm 87, 89 each comprise a notch 103 placed between the said sliding face 101 and the lock spindle 85, the said notch 103 interacting with the end of the anchoring arm 91, 92 respectively of the first or of the second flange 51, 52 in order to immobilize the said anchoring arm and to switch the lock 83 into a position allowing the anchoring arm 92, 91 respectively of the second or of the first flange 52, 51 to be released.

The operation of the generating device 1 is explained in detail in the following with reference to FIGS. 4 and 5. In these figures, the flange 51 of the generating device has been slightly truncated in order to clearly show the ring 64 of the said flange 51 and the shoulder 61 making it possible to rotate the driving branch 11, and therefore the movable portion 5, 11, 12, 13, 14 in the first direction 53.

Figure 4:
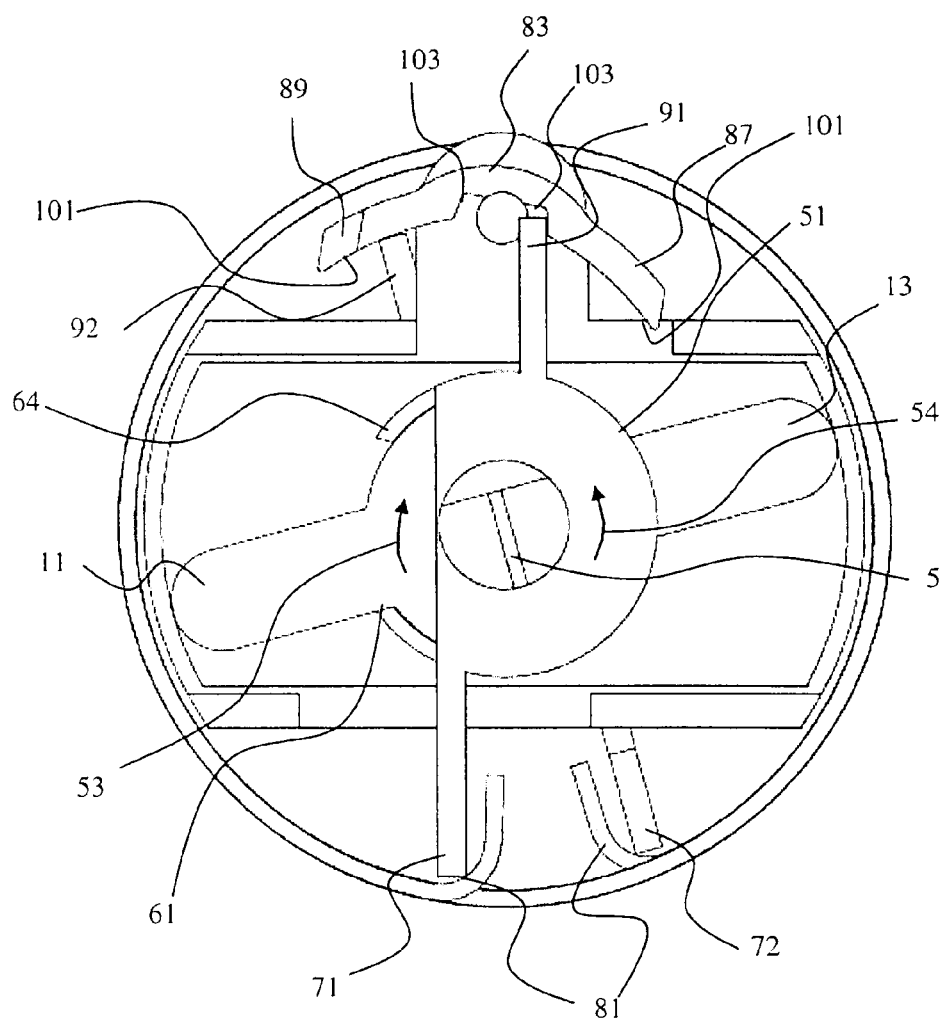
FIG. 4 is a partial top view of the generating device of FIG. 1 in which the movable portion occupies a first stable position.

Initially, the movable portion 5, 11, 12, 13, 14 of the generating device is in a first stable position shown in FIG. 4. In this first stable position, the closure ends 15, 16, 17, 18 of the branches 11, 12, 13, 14 are closed by the permanent magnets 31, 32 polarized in the same direction. In this manner, the magnetic flux flowing through the core, and therefore the electric coil 21, is substantially equal to twice the magnetic flux generated by each magnet.

The priming arm 72 of the second flange 52 is initially moved in order to rotate the flange 52 in the direction 53. Only the priming arm 72 and the anchoring arm 92 of this second flange 52 can be seen in FIGS. 4 and 5. This rotating in the direction 53 can be achieved by means of an operating member interacting with the priming arms 72.

This rotation of the second flange 52 in the direction is not accompanied by a rotation of the movable portion 5, 11, 12, 13, 14. Specifically, the notch arranged in the ring 64 of the second flange 52 to receive the driving branch 14 of the movable portion is wider than the said branch in the same way that the notch arranged in the ring 64 of the first flange 51 to receive the driving branch 11 of the movable portion is wider than the said branch 11. Moreover, the shoulder 62 of the second flange 52 rests on an edge of the driving branch 14 allowing only one rotation in a direction 54 opposite to the direction 53. Therefore, the second flange 52 cannot drive the movable portion in the direction 53 and the said movable portion therefore remains in the first stable position.

In parallel, the rotation of the second flange 52 in the direction 53 is accompanied by the rotation of the anchoring arm 92 secured to the said flange 52. The result of this is that the end of the anchoring arm 92 slides along the sliding face 101 of the second locking arm 89, which makes it possible to hold the lock 83 in a position allowing the immobilization of the anchoring arm 91 of the first flange 51. The anchoring arm 91 of the first flange 51 is therefore immobilized and the rotation of the said first flange is prevented.

Throughout the whole travel of the priming arm 72 of the second flange 52 in the direction 53, the said priming arm is brought towards the priming arm 71 of the first flange 51 and the spring 81 placed between the ends of the two priming arms is progressively bowed.

Figure 5:
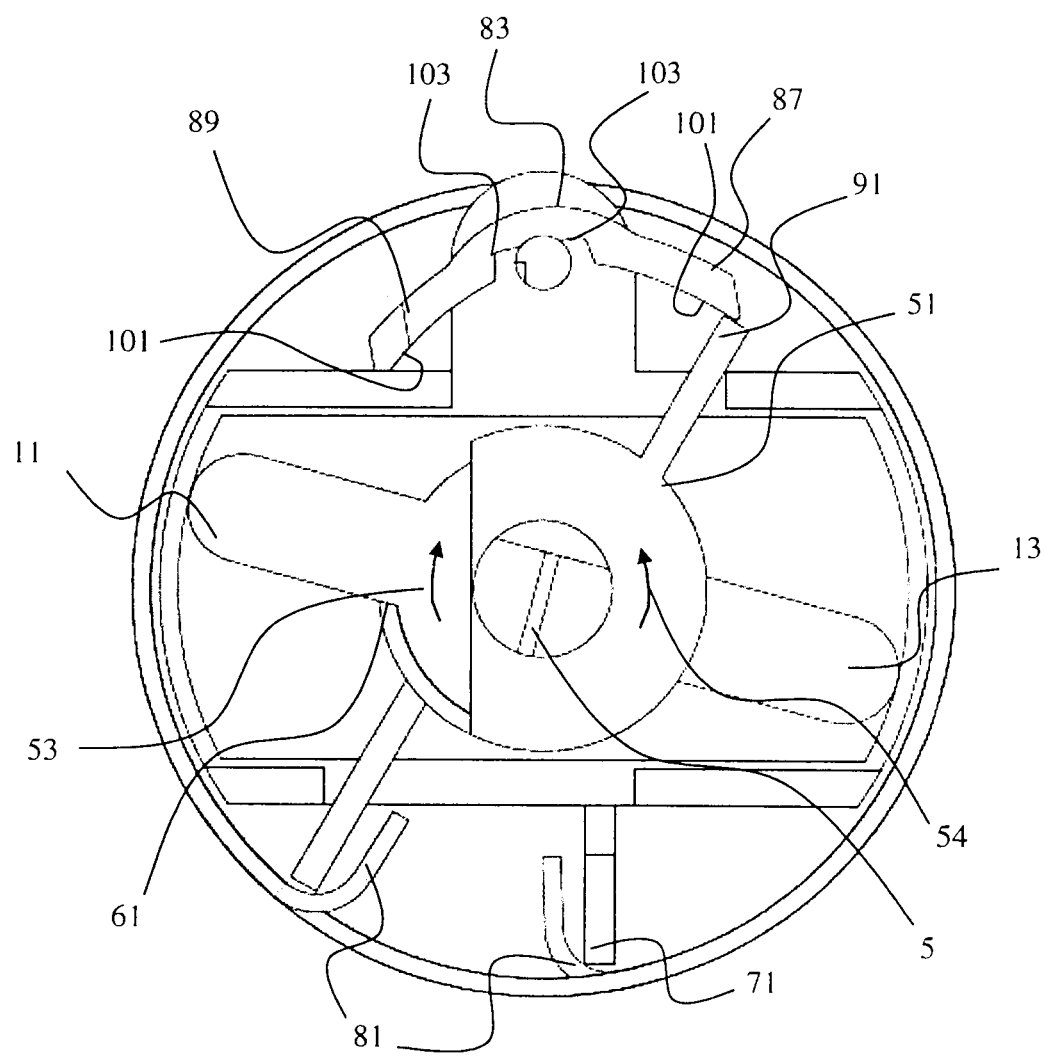
FIG. 5 is a partial top view of the generating device of FIG. 1 in which the movable portion occupies a second stable position.

As can be seen in FIG. 5, at the end of travel of the priming arm 72, the end of the anchoring arm 92 engages in the notch 103 of the second lock arm 89, which makes it possible to immobilize the said lock arm. In parallel, the lock 83 switches into a position allowing the release of the anchoring arm 91 of the first flange 51. The result of this is that the rotation of the first flange 51 is no longer hampered and that the spring 81 will be able to release its energy by rotating the first flange 51 in the direction 53. This rotation of the first flange 51 in the direction 53 is accompanied by a sudden rotation of the movable portion 5, 11, 12, 13, 14 in the same direction. Specifically, the shoulder 61 of the first flange 51 which is resting on an edge of the driving branch 11 will make it possible to drive the movable portion into the second stable position.

In this second stable position of the movable portion 5, 11, 12, 13, 14, the closure ends 15, 16, 17, 18 of the branches 11, 12, 13, 14 are closed by the permanent magnets 33, 34 polarized in the same direction but in an opposite direction to the magnets 31, 32. In this manner, the magnetic flux passing through the core, and therefore the electric coil 21, is substantially equal to twice the magnetic flux generated by each magnet but is oriented in the opposite direction. Since the electric power generated by the coil 21 is proportional to the speed of variation of the magnetic flux in the core, this power is thereby increased by virtue of the sudden rotation of the movable portion from the first stable position to the second stable position.

The generating device 1 operates in the same manner for switching from the second stable position shown in FIG. 5 to the first stable position shown in FIG. 4. Therefore, the generating device 1 is reversible, that is to say that it allows the generation of one and the same quantity of power when the control means 71, 72 are controlled in one direction or in the other. It is sufficient in this case to move the priming arm 71 of the first flange 51 in order to rotate the said flange 51 in the direction 54. This rotation of the first flange 51 is accompanied by the rotation of the anchoring arm 91 secured to the said flange, the end of which slides along the sliding face 101 of the first lock arm 87. The result of this is that the lock 83 is held in a position allowing the anchoring arm 92 of the second flange 52 to be immobilized. Throughout the whole travel of the priming arm 71 of the first flange 51 in the direction 54, the said priming arm is moved towards the priming arm 72 of the second flange 52 and the spring 81, placed between the ends of the two priming arms, is progressively bowed. At the end of travel of the priming arm 71, the end of the anchoring arm 91 is engaged in the notch 103 of the first lock arm 87, which makes it possible to immobilize the said anchoring arm. In parallel, the lock 83 switches into a position allowing the anchoring arm 92 of the second flange 52 to be released. The result of this is that the spring 81 will be able to release its power, rotating the second flange 52 in the direction 54. This rotation of the second flange 52 in the direction 54 is accompanied by a sudden rotation of the movable portion 5, 11, 12, 13, 14 in the same direction.

Figure 6:
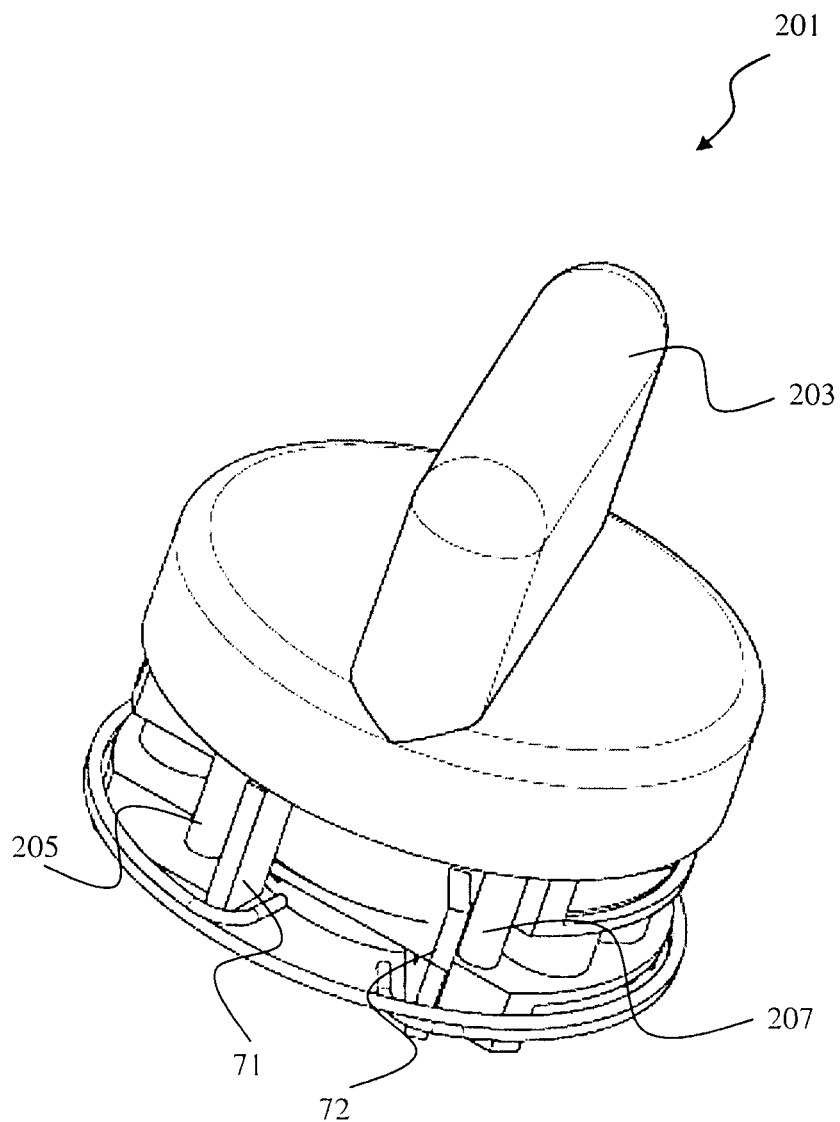
FIG. 6 is a view in perspective of a remote control comprising the generating device shown in FIG. 1.
Figure 7:
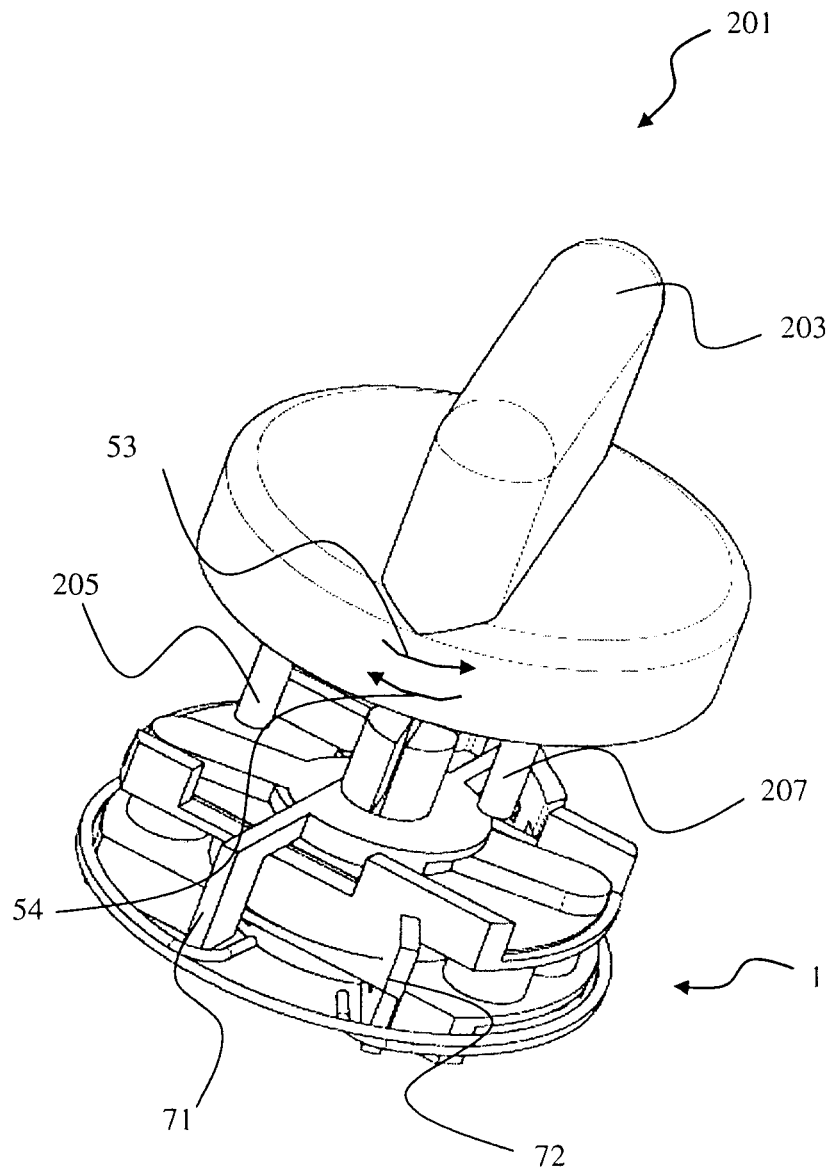
FIG. 7 corresponds to the view in perspective shown in FIG. 6 in which the operating member of the remote control has been slightly set apart from the generating device.

With reference to FIGS. 6 and 7, the remote control 201 makes it possible to remotely control slaved means not shown, in this instance means comprising two control states, such as a switch comprising an open position and a closed position. For this, the remote control 201 comprises an operating member 203 making it possible to remotely actuate the slaved means into one or the other of the control states. In order to supply the remote control means with electric power, the remote control 201 comprises a generating device 1 as described above, the said device being placed beneath the operating member 203 as is particularly clearly visible in FIG. 7. As has been described above, the generating device 1 comprises control means consisting of two priming arms 71, 72. In the embodiment shown, the control means 71, 72 of the generating device are coupled to the operating member 203 by two pins 205, 207. As can be seen in FIG. 6, the pin 205 rests on the priming arm 71 in order to rotate it in the direction 53. In the same manner, the pin 207 rests on the priming arm 72 to rotate it in the opposite direction 54.

The generating device and the remote control according to the invention therefore make it possible to generate electric power from the movement of the control means or of the operating member coupled to the said control means. The generating device therefore allows a standalone operation of the remote control.

The use of two magnetic circuits having a common core makes it possible to increase the value of the magnetic flux generated in the core, and the electric power generated by variation of the said flux is thereby increased.

The use of two pairs of magnets polarized in two opposite directions to close the magnetic circuits in respectively two stable positions of the movable portion supporting the said circuits makes it possible to increase the variation of the magnetic flux generated in the core, and the electric power generated by variation of the said flux is thereby increased all the more.

The use of a mechanism for movement of the movable portion making it possible to obtain a priming of the said mechanism with accumulation of a priming power followed by a sudden release of this power is accompanied by an increase in the speed of variation of the magnetic flux generated in the core, and the electric power generated by the variation of the said flux is thereby increased even more.

In addition, the generating device described above has a limited space requirement, notably with respect to its dimension on the axis of rotation, which allows it to be used in thin remote controls, such as wall remote controls of conventional shape making it possible to open or close a switch remotely.

The number of pieces used in the generating device is limited which makes it easier to assemble and considerably improves its reliability.

The invention claimed is:

1. An electric power-generating device comprising:
a first main portion made of a ferromagnetic material forming at least one magnetic circuit comprising a core and at least one pair of branches magnetically coupled to the core supporting closure ends of the at least one magnetic circuit,
a second main portion comprising at least one permanent magnet placed to close the magnetic circuit by relative movement of the first main portion relative to the second main portion, the at least one permanent magnet being polarized in order to have a magnetic flux flow in the magnetic circuit when the magnetic circuit is closed,
a mechanism for movement by rotation of a movable portion consisting essentially of one or other of the main portions about an axis of rotation supporting the core in order to close the at least one magnetic circuit, and
an electric coil wound around the core in order to gather the electric power obtained while the movable portion rotates, wherein the movement mechanism comprises control means and priming and driving means coupled to the control means in order to establish a priming of the mechanism by accumulating a priming power generated by at least one portion of the travel of the control means, the priming and driving means interacting with the movable portion in order to drive it between two stable positions while releasing the priming power at the end of travel of the control means.

2. The device according to claim 1, wherein the first main portion comprises a first pair of branches and a second pair of branches forming respectively a first magnetic circuit and a second magnetic circuit, and in that the second main portion comprises a first group of at least two permanent magnets placed in order to respectively close the first and the second magnetic circuit in a first stable position of the movable portion, the permanent magnets of the first group being polarized in order to increase the magnetic flux in the core in the first stable position of the movable portion.

3. The device according to claim 2, wherein the branches of the first pair of branches and the branches of the second pair of branches are mounted fixedly on the core and extend radially in directions substantially opposite to the axis of rotation.

4. The device according to claim 3, wherein the second main portion comprises a second group of at least two permanent magnets placed in order to close respectively the first and the second magnetic circuit in a second stable position of the movable portion, the permanent magnets of the second group being polarized in order to increase and reverse the magnetic flux in the core in the second stable position of the movable portion.

5. The device according to any one of claims 1 to 4, wherein the movable portion consists essentially of the first main portion.

6. The device according to claim 5, wherein the priming and driving means comprise a first flange and a second flange mounted so as to rotate about the axis of rotation, the first flange interacting with at least one driving branch of the first pair of branches of the movable portion in order to rotate the movable portion in a first direction, the second flange interacting with at least one driving branch of the second pair of branches of the movable portion in order to rotate the movable portion in a second direction opposite to the first direction.

7. The device according to claim 6, wherein the first flange and the second flange comprise a shoulder provided with a bearing face interacting with an edge of the driving branch of respectively the first pair of branches and the second pair of branches.

8. The device according to claim 6, wherein the control means comprise a priming arm mounted securely on each flange and extending radially relative to the axis of rotation.

9. The device according to claim 8, wherein the priming arm of the first flange and the priming arm of the second flange are designed in order to rotate respectively the first flange in the second direction and the second flange in the first direction.

10. The device according to claim 1, further comprising: power-accumulation means interacting with the priming and driving means in order to store the priming power while the movement mechanism is primed, and a lock interacting with the priming and driving means in order to lock the movable portion while the movement mechanism is primed and in order to unlock the movable portion at the end of travel of the control means.

11. The device according to claim 10, wherein the power-accumulation means comprise a spring mounted between a priming arm of a first and of a second flange.

12. The device according to either one of claim 8 or 11, wherein the lock comprises a lever mounted so as to pivot about a lock spindle the lever comprising a first and a second lock arm interacting with an anchoring arm respectively of the first and of the second flange in order to immobilize respectively the first flange or the second flange during the travel of the priming arm respectively of the second flange or of the first flange, and in order to release respectively the first flange or the second flange at the end of travel of the priming arm respectively of the second flange or of the first flange.

13. The device according to claim 12, wherein the first and the second lock arms each comprise:
a sliding face extending from a free end of the lock arm to the lock spindle, the sliding face interacting with the end of the anchoring arm respectively of the first or of the second flange in order to hold the lock in a position allowing the immobilization of the anchoring arm respectively of the second or of the first flange, and a notch placed between the sliding face and the lock spindle, the notch interacting with the end of the anchoring arm respectively of the first or of the second flange in order to immobilize the anchoring arm and in order to switch the lock into a position allowing the release of the anchoring arm respectively of the second or of the first flange.

14. A remote control for remotely controlling slaved means, the remote control comprising:
an operating member and an electric power-generating device in order to supply the remote control, wherein the generating device is according to claim 1, wherein the control means is coupled to the operating member.

* * * * *